Dec. 21, 1954     R. M. KENDIG     2,697,554
TEMPERATURE RESPONSIVE VALVE DEVICE
Original Filed April 25, 1950
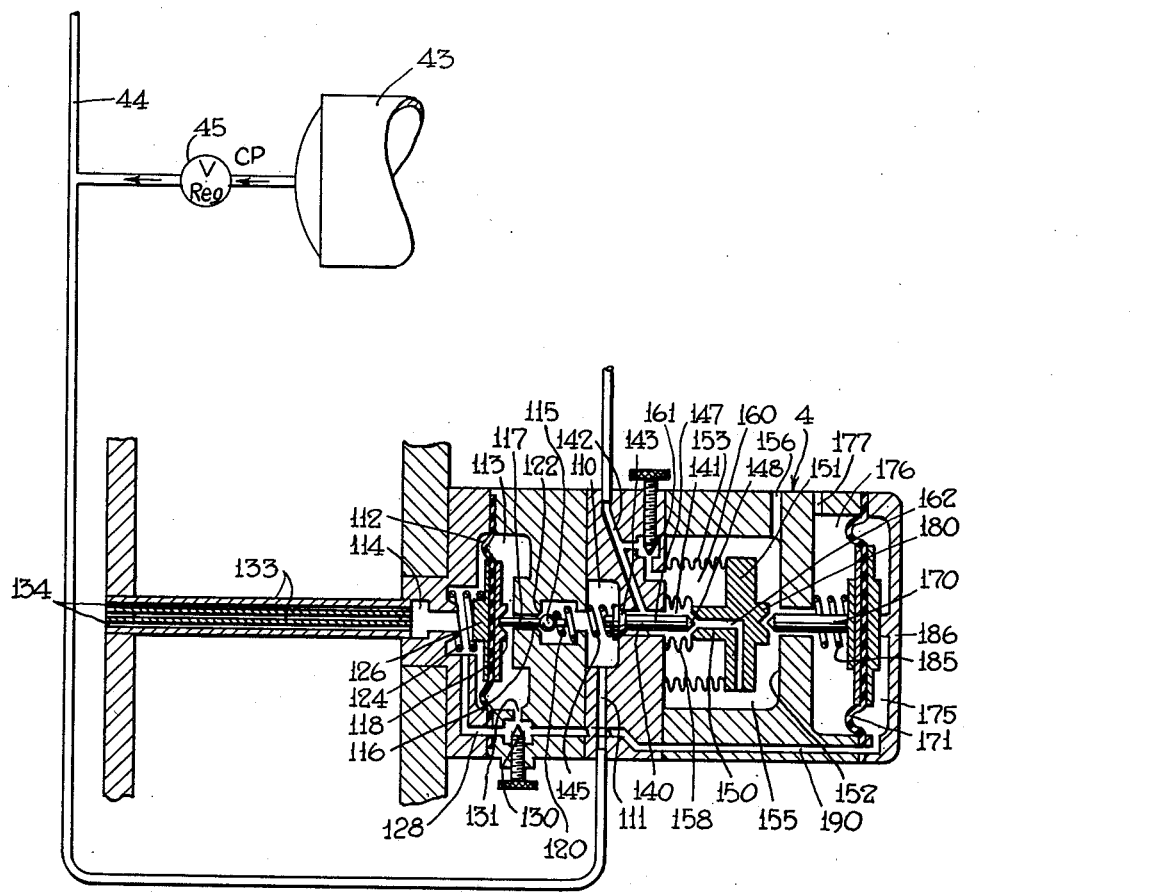
INVENTOR.
Robert M. Kendig
BY
Frank E. Miller
ATTORNEY

United States Patent Office 2,697,554
Patented Dec. 21, 1954

2,697,554

TEMPERATURE RESPONSIVE VALVE DEVICE

Robert M. Kendig, Pittsburgh, Pa., assignor to Westinghouse Air Brake Company, a corporation of Pennsylvania Original application April 25, 1950, Serial No. 157,909. Divided and this application May 16, 1951, Serial No. 226,651

3 Claims. (Cl. 236—79)

This invention is a division of my copending application Serial No. 157,909, filed April 25, 1950 and relates to a temperature responsive valve device and more particularly to such a device for effecting variations in pressure of a control fluid according to temperature of such as gas turbine combustion gases.

A prime object of the invention is to provide a quick-acting temperature responsive valve device which will effect delivery of a controlled pressure of fluid in direct proportion to the temperature of the medium being sensed.

Other objects and advantages of the invention will become apparent from the following more detailed description taken in connection with the accompanying drawing in which the single figure is a schematic representation in cross-section of a temperature responsive valve device embodying the invention.

DESCRIPTION

The temperature responsive valve device comprises a pneumatic pyrometer to provide fluid at a pressure directly proportional to the temperature of hot expansible gases being supplied to a gas turbine, and an anticipating relay valve means for controlling a fluid pressure communication between the pneumatic pyrometer and a device to be controlled.

The pneumatic pyrometer comprises a casing having a fluid pressure supply chamber 110 formed therein which is adapted to receive fluid under pressure from such as a pipe 44 by way of a casing passage 111. A resilient diaphragm 112 is provided, clamped at its outer periphery between two portions of the casing. The diaphragm 112 is subject opposingly to pressure of fluid in a chamber 113 at one side and to pressure of fluid in a chamber 114 at its opposite side. A supply valve 115 is provided, disposed in the supply chamber 110 for controlling communication through a casing bore 116 extending from said supply chamber to the chamber 113. The valve 115 is operably connected to the diaphragm 112 through the medium of a stem 117 extending through the bore 116. One end of the stem 117 is attached to the valve 115 while the opposite end rockably rests in a follower element 118 carried by the diaphragm. A tapered coil spring 120 disposed in the supply chamber 110 is arranged to urge the stem 117 into engagement with the follower element 118. The diameter of the stem 117 is considerably less than the diameter of the bore 116 to allow for flow of fluid under pressure in the clearance space therebetween while at the same time allowing for self-alignment of the valve 115. The tapered spring 120 abuts a casing shoulder at its larger end and abuts the valve 115 at its opposite end so that the valve is thereby centered relative to an opening 122 of the bore 116 which opens into the chamber 110. Proximity of the valve 115 to the opening 122 determines the flow area which will be available to the fluid under pressure in chamber 110 for flow through bore 116 into chamber 113. A compression spring 124, disposed in the chamber 114, is arranged to bias the diaphragm 112 in the direction of chamber 113. One end of the spring 124 is located in an annular recess formed in the casing while its opposite end abuts a diaphragm follower which is provided with a central projecting portion 126 around which the respective end of the spring fits for location thereby. A passage 128 communicates between the chambers 113 and 114 for conveying fluid under pressure from the former to the latter. A needle valve 130 is provided in passage 128 to regulate the volume of fluid under pressure which may flow from chamber 113 to chamber 114. Needle valve 130 is attached to a stem in screw-threaded attachment with the casing and projecting outwardly thereof. The outer end of the stem may be turned manually to advance or withdraw the needle valve 130 into and out of an opening 131 which forms a part of passage 128 at its junction with chamber 113. The area presented to fluid under pressure from chamber 113 for flow to chamber 114 may thus be carefully adjusted for reasons which will hereinafter become obvious.

In order to sense the temperature of a medium such as the hot expansible gases of a gas turbine, as a chosen example, capillary tube or tubes 133 attached to the casing are provided for projection into the path of flow of such gases. The tubes 133 provide continuous restricted passages 134 which open the chamber 114 to the atmosphere. In the case of hot expansible gases at high velocity and pressure, the tubes 133 should be arranged to extend into the path of travel of such gases with arrangement made for the ends of the tubes to discharge to atmosphere. The tubes 133 are constructed of heat resistant material in order to withstand the hot combustion gases and are of sufficient strength to withstand shock and vibration caused by the hot gases passing over them at high velocity. A tube (not shown) of larger internal diameter provided with a choke at its outer projecting end might be substituted for the plurality of smaller tubes 133.

Operation of above described portion of temperature sensitive device

In operation of the pneumatic pyrometer portion of the device, with the supply chamber 110 connected to a source of fluid at a substantially constant pressure and with the tubes 133 extending through the path of flow of hot expansible gases entering the gas turbine, and with the valve 115 disposed a distance away from opening 122, fluid under pressure from the supply chamber 110 will flow via the unseated valve and the bore 116 into the chamber 113. With the needle valve 130 disposed a certain distance away from opening 131, fluid under pressure supplied to chamber 113 will flow by way of such opening and the passage 128 into the chamber 114, from which a leak to atmosphere will occur by way of passages 134 in tubes 133. According to a feature of the invention, with the constant bias imposed on the diaphragm 112 by the spring 124, the pressure of fluid in the chamber 113 will be maintained at a certain constant value greater than any pressure which may exist in the chamber 114; that is, through deflection of diaphragm 112 and thereby movement of valve 115, greater or lesser amounts of fluid under pressure from the supply chamber 110 will flow into chamber 113, as necessary to maintain the constant pressure differential across needle valve 130 between chambers 113 and 114 against the leak to atmosphere through tubes 133. By virtue of the constant differential in pressure thus maintained between chambers 113 and 114, for any given adjusted position of the needle valve 130, the volume of fluid flowing from chamber 113 via said needle valve into chamber 114 thence to atmosphere by way of tubes 133 will be constant during equal time intervals. Pressure of fluid in tubes 133, hence in chamber 113, will be directly proportional to the temperature of such fluid, which temperature will depend upon and indicate the temperature of the hot expansible gases to be admitted to the gas turbine, in the present instance. By employment of such a constant volume of flow through tubes 133 to reflect the variations in temperature of a medium, much faster response to such variations in temperature is attained in chamber 113 in form of corresponding pressure variations than can be attained by employment of a constant volume of static fluid contained in a closed bulb due, it is believed, to a lesser heat capacity, a greater area exposed to the hot gases, and certainly to a greater heat transfer coefficient. The constant volume flow method thus affording pressure variations directly proportional to changes in temperature being sensed simplifies calibration of the device and greatly reduces error over previous pneumatic pyrometers of a variable flow type in which pressure varied approximately as the square root of the temperature, introducing possibility of considerable error at the higher temperatures where equal increments in temperature change produce increasingly greater increments in resultant pressure change.

*Description of relay portion of temperature sensitive device*

The anticipating relay portion of the device comprises a casing secured to the casing of the pyrometer portion in such fashion that the supply chamber 110 is common to both and provides a compact assemblage. A bore 140 in the casing is provided to communicate between the supply chamber 110 and a delivery chamber 141 which is constantly open to a fluid pressure control passage 142 formed in the casing. A supply valve 143 is disposed in the supply chamber 110 for controlling communication between said supply chamber and the delivery chamber 141 by way of the bore 140. A tapered seat is formed in the casing around the end of bore 140 opening into the chamber 110 to accommodate the supply valve 143. A compression spring 145 disposed in the supply chamber 110 is arranged to urge the supply valve 143 toward a seated position in which it is shown in the drawing. A stem 147 of lesser diameter than the diameter of the bore 140 through which it extends is attached at its one end to the supply valve 143 to act as a medium through which same may be unseated against action of spring 145. The opposite end of the stem 147 is disposed in the delivery chamber 141 and is tapered to form an exhaust valve 148. An exhaust valve seat element 150, disposed opposite to and in alignment with the exhaust valve 148, is provided, attached at its one end to a movable abutment 151 disposed within a cavity 152 formed in the casing. The movable abutment 151 is reciprocably connected to the casing through attachment at its outer peripheral edge to one end of a bellows 153, the opposite end of which is attached to the casing at one end of cavity 152. A fluid pressure exhaust chamber 155 is defined by the inner wall of cavity 152, exteriorly of the movable abutment 151, and bellows 153. Exhaust chamber 155 is constantly open to the atmosphere by way of an exhaust port 156 opening outwardly through the casing. A bellows 158 is attached at its one end to a projecting end of seat element 150 and at its opposite end to the casing encircling the opening to the bore 140. The bellows 158 allows for reciprocable movement of the seat element 150 along with abutment 151 and defines an outer wall of the delivery chamber 141 and an inner wall of an annular bellows chamber 160 within bellows 153 between a left-hand end wall of cavity 152 and one face of the abutment 151. The bellows chamber 160 is constantly open to the control passage 142 by way of a needle valve 161 which is adjustable exteriorly of the casing to vary the area available for flow of fluid under pressure between passage 142 and the bellows chamber 160. An exhaust passage 162, opening into the exhaust chamber 155 through the abutment 151, extends longitudinally through the seat element 150 to an opening disposed opposite to the exhaust valve 148. A tapered seat is formed in the projecting end of the seat element 150 to accommodate the exhaust valve 148.

For actuating the seat element 150 and thereby stem 147 and supply valve 143 a stem 170 is provided which is attached to a resilient diaphragm 171 by means of the usual diaphragm follower elements suitably attached thereto. The diaphragm may be suitably clamped at its periphery between two portions of the casing and is subject opposingly to pressure of fluid in a control chamber 175 at one side and to pressure of fluid in a chamber 176 at its opposite side which latter chamber is constantly open to atmosphere via such as a port 177. A casing partition separates chamber 155 from chamber 176 and an opening is provided therein through which the stem 170 extends with clearance. A socket 180 is formed in one face of the abutment to receive the end of the stem 170 which is rounded or tapered to fit the socket to assure transmission of thrust to the abutment when in engagement therewith. A compression spring 185, disposed in chamber 176 is arranged to bias the diaphragm 171 in the direction of chamber 175 toward a rest position in which it is shown in the drawing and in which the respective diaphragm follower abuts a centrally projecting tip of a portion of the casing forming an end wall 186 of the control chamber 175. In rest position of the diaphragm 171, the projecting end of stem 170 connected thereto will be disposed a short distance away from the abutment 151. The control chamber 175 in the anticipating relay portion of the device 4 is constantly open by way of a casing passage 190 to the chamber 114 in the pneumatic pyrometer portion of the device. It will be seen, therefore, that pressure of fluid in the control chamber 175 will be the same as that existing in chamber 114 and will therefore be directly proportional to temperature of the capillary tubes 133, hence to the temperature of the hot gases entering the gas turbine.

*Operation of relay portion of temperature sensitive device*

In operation of the anticipating relay portion of the device in conjunction with the pneumatic pyrometer portion, until the pressure of fluid in the control chamber 175 attains a value sufficient to overcome the bias of the spring 185, the diaphragm 171 will remain in its rest position with the stem 170 out of engagement with the abutment 151 which will be in the position in which it is shown in the drawing with seat element 150 out of contact with the exhaust valve 148, and the supply valve 143, therefore, will be in its seated position in which it is shown in the drawing. With the supply valve 143 closed, fluid under pressure in the supply chamber 110 cannot reach the delivery chamber 141 and with the exhaust valve 148 open said delivery chamber will be vented to atmosphere by way of the passage 162 in seat element 150 and attached abutment 151, exhaust chamber 155 and the port 156. Passage 142 and thereby bellows chamber 160 will be vented to atmosphere by way of the bore 140 and the delivery chamber 141, as will be appreciated from preceding description.

When the pressure of fluid in the control chamber 175, corresponding to a certain temperature of the capillary tubes 133 and hence of the turbine gases, becomes sufficient to overcome opposition of the spring 185 the diaphragm 171 will be deflected in the direction of chamber 176 to cause engagement of stem 170 with the abutment 151, after which said stem and abutment in moving with continued slight additional deflection of the diaphragm will move seat element 150 into seating engagement with the exhaust valve 148, thereby closing off the delivery chamber 141, hence passage 142 and bellows chamber 160 to the atmosphere.

In employing the device to prevent increase in temperature of turbine gases above a certain maximum allowed temperature, in a manner as will hereinafter be described, the needle valve 130 will be adjusted so that pressure of fluid in chambers 114 and 175 will cause closing of the exhaust valve 148 at a temperature of tubes 133 somewhat less than the maximum allowed temperature of the gases passing over the tubes. The needle valve 130 is so adjusted in order to assure that the anticipating relay portion be brought into operation before the maximum allowed temperature of the gases is reached as the temperature of the capillary tubes 133, hence pressure in connected chambers 114 and 175, will lag the temperature of the gases when the latter temperature is increasing rapidly.

When the pressure of fluid in chamber 175, corresponding to temperature of the capillary tubes 133, increases above that necessary to seat the exhaust valve 148, resultant further deflection of the diaphragm 171 against spring 145, through movement of the stem 170, abutment 151, attached seat element 150, and the stem 147, will cause unseating of the supply valve 143. Fluid under pressure from the supply chamber 110 will then flow by way of the unseated supply valve 143 and bore 140 into the delivery chamber 141 and control passage 142 and, by way of needle valve 161, into the bellows chamber 160 where the pressure of such fluid acting on the abutment 151 will act to oppose action of pressure of fluid in chamber 175 acting on diaphragm 171. When the pressure of fluid in the bellows chamber 160 acting on abutment 151, together with action of springs 145 and 185, becomes sufficient to overcome action of the pressure of fluid in the chamber 175, the abutment 151 will move in the direction of chamber 155, carrying the stem 170 with it and thereby allowing spring 145 to seat the supply valve 143 while the exhaust valve 148 remains seated. Pressure of fluid in the passage 142 and delivery chamber 141 is thus held by closure of the supply valve 143.

When the temperature of the hot gases passing over the tubes 133 increases slowly, the temperature of these tubes will be the same as that of the gases and will increase at the same relatively slow rate, and, it will be appreciated, that the pressure of fluid in chambers 114 and 175 therefore will be directly proportional to the temperature of the hot gases and will increase at the same slow rate. Under these conditions, once the supply valve 143 is unseated by action of pressure of fluid in chamber 175, resultant flow of fluid from the supply chamber 110 into passage 142 will have sufficient time to flow into the bellows chamber 160 to increase the pressure of fluid therein at the same rate as the increase in pressure in chamber 175, and the action of such pressure in chamber 160 on abutment 151 will be such as will maintain the valve 143 positioned to maintain pressure of fluid in passage 142 in direct proportionality to pressure of fluid in chamber 175, hence in direct proportionality to the temperature of the tubes 133 and therefore of the hot gases, in the present instance.

When the temperature of the hot gases increases very rapidly, there may be instantaneous differences between the temperature of the tubes 133 and that of the gases as the tubes warm up to gas temperature. The temperature of the tubes 133, hence pressure of fluid in chambers 114 and 175, under the assumed condition, will therefore no longer be directly proportional to the rapidly increasing temperature of the hot gases. The rate of increase in temperature of the tubes 133, hence the rate of increase in pressure in chambers 114 and 175, will reflect the discrepancy between the temperature of the tubes and the temperature of the gases, in other words, the rate at which the temperature of the tubes 133 and the pressure in chamber 114 and 175 will change in a given instant is a measure of the amount of difference between the temperature of the tubes and that of the gases and so indicates the temperature toward which the tubes are headed. Then once the supply valve 143 is initially unseated by action of the pressure of fluid in chamber 175 which is increasing in rate as above described, fluid under pressure will flow into the passage 142 and by way of the needle valve 161, will flow into the bellows chamber 160 to oppose the action of pressure of fluid in chamber 175. By virtue of the needle valve 161, a sufficient restriction to path of flow will be imposed on fluid flowing from passage 142 to bellows chamber 160 that the instantaneous pressure of fluid supplied to passage 142 will exceed that in the bellows chamber 160. The amount that the pressure of fluid in passage 142 is allowed to exceed pressure of fluid in the bellows chamber 160 will depend upon the rate of change in pressure in chamber 175, hence rate of change in temperature of the tubes 133, which, as previously mentioned, was an indication of the gas temperature toward which the tubes were headed. By proper adjustment of the needle valve 161, the pressure of fluid in passage 142 will be substantially maintained at a direct proportionality to the rapidly changing temperature of the turbine gases even though the temperature of the tubes 133 lags that of the gases by a substantial time interval.

Conversely, with both the supply valve 143 and the exhaust valve 148 closed to hold a pressure of fluid in passage 142 in accord with a stable temperature of tubes 133, when the temperature of the gases drops slowly, the temperature of the tubes 133 will be that of the gases and will drop correspondingly as will pressure of fluid in the chambers 114 and 175. Such reduction in pressure in the chamber 175 will allow spring 185 and pressure of fluid in bellows chamber 160 to effect movement of abutment 151 so that seat element 150 will leave the exhaust valve 148. Fluid under pressure will then release from bellows chamber 160 and passage 142 at substantially the same rate until pressure of fluid in chamber 175 is again preponderant over force of spring 185 and pressure of fluid in the bellows chamber 160, whereupon, through deflection of diaphragm 171, movement of stem 170 in engagement with abutment 151 will cause reseating of element 150 on valve 148.

If, reduction in temperature of the turbine gases occurs at a rate faster than can be followed by the tubes 133, such reduction, reflected by a pressure drop in the chamber 175, will result in unseating of the element 150 from exhaust valve 148 to allow for reduction in pressure in passage 142. The action of needle valve 161 on release of fluid under pressure from the bellows chamber 160 will be such as to allow pressure of fluid in the passage 142 to reduce in direct proportionality with reduction in temperature of the turbine gases in anticipation of the temperature toward which the temperature of the tube 133 is headed as indicated by the rate of change of the latter temperature.

Whether or not the drop in temperature of the tubes 133, hence drop in pressure in chamber 175, occurs rapidly, once the pressure of fluid in chamber 175 drops and remains below the value required to maintain the seat element 150 in engagement with valve 148 against opposition of spring 185 and pressure in bellows chamber 160, the diaphragm 171 will deflect in the direction of chamber 175 to allow element 150 to unseat and remain unseated from valve 148, venting passage 142 to atmosphere via chamber 141, passage 162, chamber 155 and port 156.

It will be seen that the device will respond to an increase in temperature of the turbine gases above a desired maximum value to effect supply of fluid to control passage 142 at a pressure or pressures directly proportional to the temperature of such gases, whether increasing or decreasing above said maximum value and will respond to a decrease in temperature of the gases below the maximum value to effect venting of the control passage 142 to atmosphere.

SUMMARY

It will now be seen that I have provided a relatively simple temperature responsive valve device which will effect rapid delivery of a controlled pressure of fluid in direct proportion to the temperature of a medium being sensed.

Having now described my invention, what I claim as new and desire to secure by Letters Patent, is:

1. A pneumatic pyrometer device comprising a casing having a fluid pressure supply chamber adapted to be connected to a source of fluid under pressure and also having a cavity, a resilient diaphragm disposed in said cavity to define a deflectable partition dividing said cavity into a first fluid pressure chamber and a second fluid pressure chamber, said casing having a first fluid pressure communication extending between said fluid pressure supply chamber and said first chamber and having a second fluid pressure communication extending between said first fluid pressure chamber and said second fluid pressure chamber, valve means arranged to control degree of opening and closing of said first fluid pressure communication and attached for movement with deflection of said diaphragm, flow restricting means in said second communication, spring means arranged to bias said diaphragm in the direction of said first fluid pressure chamber, a restricted tubular element attached at its one end to said casing and opening into said second fluid pressure chamber, at least a portion of said tubular element being adapted for exposure on its exterior surface to action of a heat zone, and a passage opening from said second fluid pressure chamber for connection to pressure responsive temperature indicating means.

2. A temperature sensitive device comprising a restricted tubular element for conveying fluid under pressure through a heat zone, means defining a fluid pressure supply chamber adapted to receive fluid under pressure from a source thereof, means defining a fluid pressure communication having an inlet connected to said supply chamber and an outlet connected to said tubular element, flow restricting means in said communication, valve means controlling supply of fluid under pressure from said supply chamber to said inlet, and biased diaphragm means subject opposingly to pressures in said communication at opposite sides of said flow restricting means and operatively connected to said valve means to maintain pressure of fluid in said communication at the inlet side of said flow restricting means constantly a certain degree greater than pressure of fluid existing in said communication at the outlet side of said flow restricting means as the latter pressure varies in direct proportion to temperature of said tubular element.

3. A pressure responsive valve device comprising a casing having formed therein in series along an axis of symmetry common to each, a supply chamber adapted to be connected to a source of fluid under pressure, a fluid pressure exhaust chamber constantly open to atmosphere and a diaphragm chamber, a first partition integral with said casing disposed between the supply and exhaust chambers and having a supply opening extending therethrough coaxial with the chambers and having a tapered supply valve seat exposed to said supply chamber and encircling said supply opening, a second partition integral with said casing disposed between the exhaust and diaphragm chambers and having a stem-accommodating opening extending therethrough in coaxial alignment with said supply opening, a supply valve in said supply chamber having a tapered shoulder for self-aligning seating engagement with said tapered supply valve seat, a bias compression spring in said supply chamber in abutting relationship at its opposite ends with said casing and with said supply valve, respectively, to urge the latter toward said supply valve seat, a valve stem rigidly attached at its one end to said supply valve and extending with clearance through said supply opening, a tapered exhaust valve attached to the opposite projecting end of said valve stem, a disk-shaped movable abutment disposed in said exhaust chamber coaxial therewith, said abutment having an exhaust passage extending from its center radially outward to its outer peripheral edge and a central socket formed in a face constantly exposed to said exhaust chamber, a first cylinder-shaped bellows member disposed in said exhaust chamber coaxial therewith having opposite ends in sealed attachment with said first partition and with said movable abutment to define the outer peripheral wall of an anticipation control chamber, a cylinder-shaped exhaust valve seat element disposed in said first bellows member attached at its one end to said movable abutment coaxial therewith and projecting into proximity of said exhaust valve, said seat element having a central exhaust communication extending longitudinally therethrough into junction with the exhaust passage in said movable abutment and having a tapered exhaust valve seat formed in its projecting end in encirclement of the open end of said communication, a second cylinder-shaped bellows member within said first bellows member coaxial therewith having opposite ends in sealed attachment with said first partition in encirclement of said supply opening and with said seat element in encirclement of said exhaust valve seat, respectively, to define the inner peripheral wall of said anticipation control chamber and the outer peripheral wall of a delivery chamber, said casing having a delivery passage constantly open to said delivery chamber by way of the clearance space between said valve stem and the wall of said supply opening and being adapted for connection to a device to be controlled, said casing also having an anticipation control communication extending between said delivery passage and said anticipation control chamber, a flow restricting element disposed in said anticipation control communication adjustable externally of said casing to regulate degree of restriction, a deflectable circular diaphragm means secured at its outer periphery to said casing disposed within said diaphragm chamber in coaxial alignment therewith and dividing the interior thereof into a control chamber adapted to receive fluid at variable pressures on its one side and an atmospheric chamber open to the stem-accommodating opening in said second partition on its opposite side, an actuating stem attached for movement with deflection of said diaphragm means extending through said atmospheric chamber and through said stem accommodating opening into proximity of said movable abutment within said exhaust chamber, the projecting end of said actuating stem being tapered for self-aligning contact with the socket formed in the center of said abutment, and a control compression spring encircling said actuating stem and abutting at its opposite ends said second partition and said diaphragm means to act thereon in opposition to action of pressure of fluid in said control chamber.

References Cited in the file of this patent

UNITED STATES PATENTS

| Number | Name | Date |
| --- | --- | --- |
| 339,756 | Frew | Apr. 13, 1886 |
| 773,684 | Speller | Nov. 1, 1904 |
| 1,630,318 | Tate | May 31, 1927 |
| 2,409,871 | Krogh | Oct. 22, 1946 |
| 2,512,561 | Ziegler | June 20, 1950 |
| 2,524,445 | Ifield | Oct. 3, 1950 |
| 2,606,420 | Moore | Aug. 12, 1952 |

FOREIGN PATENTS

| Number | Country | Date |
| --- | --- | --- |
| 90,639 | Sweden | Oct. 26, 1937 |